United States Patent
Lo et al.

(10) Patent No.: US 9,613,234 B2
(45) Date of Patent: Apr. 4, 2017

(54) SYSTEM AND METHOD FOR MOUNTING A MAGNETIC CARD READER HEAD ONTO A CARD READER

(71) Applicant: BBPOS LIMITED, Hong Kong (HK)

(72) Inventors: Chi Wah Lo, Hong Kong (HK); Hwai Sian Tsai, Hong Kong (HK); Kin Wai Chan, Hong Kong (HK)

(73) Assignee: BBPOS Limited, Hong Kong (HK)

( * ) Notice: Subject to any disclaimer, the term of this patent is extended or adjusted under 35 U.S.C. 154(b) by 35 days.

(21) Appl. No.: 13/938,808

(22) Filed: Jul. 10, 2013

(65) Prior Publication Data

US 2014/0021255 A1 Jan. 23, 2014

Related U.S. Application Data

(60) Provisional application No. 61/673,310, filed on Jul. 19, 2012.

(51) Int. Cl.
*G06K 7/08* (2006.01)

(52) U.S. Cl.
CPC ............ *G06K 7/082* (2013.01); *G06K 7/084* (2013.01); *Y10T 29/4902* (2015.01)

(58) Field of Classification Search
USPC .......................................... 235/449; 360/240
See application file for complete search history.

(56) References Cited

U.S. PATENT DOCUMENTS 5,091,811 A * 2/1992 Chang ...................... G11B 5/55
  360/2
5,270,523 A * 12/1993 Chang ..................... G06K 7/015
  235/449

FOREIGN PATENT DOCUMENTS

| CN | 2257046 Y | 6/1997 |
| CN | 2515713 Y | 10/2002 |
| CN | 201007824 Y * | 1/2008 |

OTHER PUBLICATIONS

SIPO; International Search Report; Oct. 24, 2013; entire document.

* cited by examiner

*Primary Examiner* — Daniel Hess
(74) *Attorney, Agent, or Firm* — Howison & Arnott, LLP

(57) ABSTRACT

A magnetic reader head assembly includes a magnetic reader head compartment, a frame and an elastic component. The magnetic reader head compartment comprises electronic and mechanical components of the magnetic reader head. The frame has a front side and a back side and has a footprint matching the footprint of the magnetic reader head compartment. The front side is configured to attach to a back wall of the magnetic reader head compartment while allowing the magnetic reader head compartment to move out or retract from the frame. The elastic component is configured to be placed at the back side of the frame and to push the frame out in order to press the magnetic reader head compartment against a magnetic card stripe.

8 Claims, 6 Drawing Sheets

SYSTEM AND METHOD FOR MOUNTING A MAGNETIC CARD READER HEAD ONTO A CARD READER

CROSS REFERENCE TO RELATED APPLICATIONS

This application claims the benefit of U.S. provisional application Ser. No. 61/673,310 filed on Jul. 17, 2012 and entitled SYSTEM AND METHOD FOR MOUNTING A MAGNETIC CARD READER HEAD ONTO A CARD READER, which is commonly assigned, and the contents of which are expressly incorporated herein by reference.

FIELD OF THE INVENTION

The present invention relates to a system and a method for mounting a magnetic card reader head onto a wall or chassis of a card reader.

BACKGROUND OF THE INVENTION

Magnetic cards are used to store various types of data and are applied in different areas including payment cards, gift cards, security access control systems, identification system and even toys. Data are encoded magnetically on magnetic stripes that are usually attached to a plastic or paper card. The data can be retrieved by using magnetic card readers. Magnetic card readers have a magnetic head that picks up magnetic signals from the magnetic stripe of a card. Since the strength of the magnetic signals from the magnetically encoded data on the stripe is usually weak, the magnetic head of the card reader and the magnetic stripe need to be in close contact in order to generate a good data read.

In manually operated magnetic card readers, there is usually a card gliding groove with two opposing walls. The magnetic head is usually housed in a metal compartment that contains all the electronics inside. The magnetic head is positioned on one of the two opposing walls so that when a card is placed inside the groove, the magnetic stripe on the card and the magnetic head on the card reader are aligned in position. When the user slides the magnetic card along the groove, the encoded data are picked up by the magnetic head. In most cases, the card can be read from both directions, that is, the card cab be slid starting from either end of the groove. To enable a better contact, the magnetic head assembly is usually mounted on a thin metal frame 102 having two wings 103, 104 extending from both sides, as shown in FIG. 1. The metal sheet of the frame 102 is flexible and allows the magnetic head 101 to retract away from the opposing wall when a card is slid across. The wings 103, 104 thus act as a spring that provides a pressure in order to keep the magnetic stripe and the magnetic head in close contact. If the pressure is too small, the contact may not be good enough; on the other hand, if the pressure is too large, the user will find it difficult to slide the card across the groove. In extreme cases, too much pressure can cause abrasion and damage of the card or the magnetic stripe.

Many magnetic card reader head modules are available today and most of them are using a similar design with the two wings for mounting the magnetic head onto one of the opposing walls. One of the problems of the current design is the fact that the frame and the wings increase the overall size of the card reader. This is counter to the current trend in electronic devices for becoming smaller in physical size. It is infeasible to use the same design in a very compact magnetic card reader because of the extended wings. Also, there are increased security requirements on card readers because sensitive data are stored on payment cards. To support the increased security features, a larger magnetic head compartment is needed to house the additional electronic and mechanical components. With a larger magnetic head compartment, the size of the wings also increases and the overall assembly size increases. Thus, there is a need for a new magnetic head mounting mechanism that does not increase overall size of the magnetic card reader.

SUMMARY OF THE INVENTION

In general, in one aspect the invention provides a magnetic reader head assembly including a magnetic reader head compartment, a frame and an elastic component. The magnetic reader head compartment comprises electronic and mechanical components of the magnetic reader head. The frame has a front side and a back side and has a footprint matching the footprint of the magnetic reader head compartment. The front side is configured to attach to a back wall of the magnetic reader head compartment while allowing the magnetic reader head compartment to move out or retract from the frame. The elastic component is configured to be placed at the back side of the frame and to push the frame out in order to press the magnetic reader head compartment against a magnetic card stripe.

Implementations of this aspect of the invention may include one or more of the following features. The elastic component comprises a metal plate spring. The metal plate spring comprises a curved elastic thin rectangular body having a central through-opening and left and right side tabs. The frame comprises a rectangular body having a central through-opening, left and right backward extending plates, top and bottom frontward extending plates a top upward extending plate and a bottom downward extending plate. The magnetic reader head compartment is inserted in the front side of the frame between the top and bottom frontward extending plates of the frame and the metal plate spring is inserted in the backside of the frame between the left and right backward extending plates of the frame. The metal plate spring is secured onto the backside of the frame by engaging the left and right side tabs within left and right slots formed on the left and right backward extending plates of the frame, respectively. The magnetic reader head compartment is welded in the front side of the frame. The elastic component comprises a metal spiral spring. The elastic component comprises an elastomer material, or a flexible polymer material.

In general, in another aspect the invention provides a method for attaching a magnetic card reader head onto a card reader frame. The method includes providing a magnetic reader head compartment comprising electronic and mechanical components of the magnetic reader head. Next, providing a frame comprising a front side and a back side and a having a footprint matching the footprint of the magnetic reader head compartment. The front side is configured to attach to a back wall of the magnetic reader head compartment while allowing the magnetic reader head compartment to move out or retract from the frame. Next, providing an elastic component configured to be placed at the back side of the frame and to push the frame out in order to press the magnetic reader head compartment against a magnetic card stripe.

DETAILED DESCRIPTION OF THE INVENTION

Figure 2:
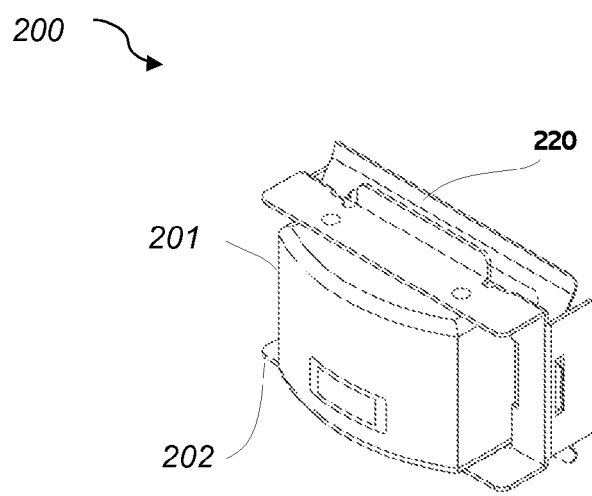
FIG. 2 shows a front perspective view of a magnetic read head mounting mechanism, according to this invention.

The invention provides a new mechanism for mounting a magnetic head onto one of the walls or chassis of a magnetic card reader without using extended wings. The mechanism includes a frame for housing the magnetic head and an elastic or flexible elastic body at the back of the frame for applying the required pressure to the magnetic head. In one of the embodiments, the elastic body is in the form of a curved rectangular metal plate spring. The frame is made of metal and holds both the metal plate spring and the magnetic head compartment, as shown in FIG. 2.

The elastic body is coupled either flexibly or tightly to the frame. The whole mounting mechanism is mounted either flexibly or tightly to the wall or chassis of a card reader. With this mounting mechanism, the size of the whole magnetic head assembly is greatly reduced and it can be fit into a magnetic card reader with a more compact form factor. The mounting mechanism may also be used to mount a larger magnetic read head compartment than currently used in the traditional magnetic head assembly. The larger magnetic read head compartment is used to house additional electronic and mechanical components.

Figure 1:
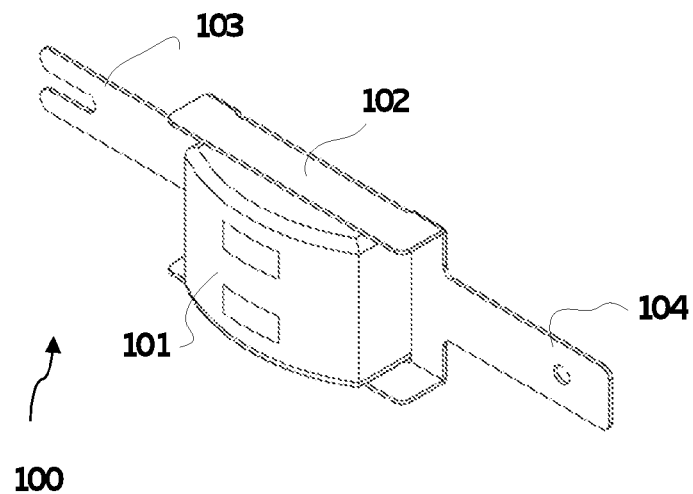
FIG. 1 shows a front perspective view of a typical prior art design of a magnetic read head mounting mechanism.

A typical prior art magnetic card reader includes housing with a groove where a card with a magnetic stripe is slid along, and a magnetic reader head module mounted on one of the walls of the housing that form the groove or the chassis of the magnetic card reader. Referring to FIG. 1, a typical prior art magnetic reader head module 100 includes a metal compartment 101 and a thin metal frame 102. The metal compartment 101 houses the magnetic sensor frontend and the decoding circuitry. The thin metal frame 102 holds the metal compartment 101 and it includes a rectangular frame 102 and two sidewise extending wings 103, 104, for mounting the whole magnetic reader head module onto a wall or chassis of a magnetic card reader. The metal sheet of the frame 102 is flexible and allows the magnetic head sensor to retract away from the opposing wall when a card is slid across the groove. The wings 103, 104 thus act as a spring and provide a pressure to keep the magnetic stripe and the magnetic head in close contact. The length of the wings 103, 104 must be long enough for the spring to be effective. Therefore, the whole assembly occupies a lot of space in order to allow movement of the wings. The large size of the assembly is undesirable especially in cases where a small physical size is required.

Figure 3A:
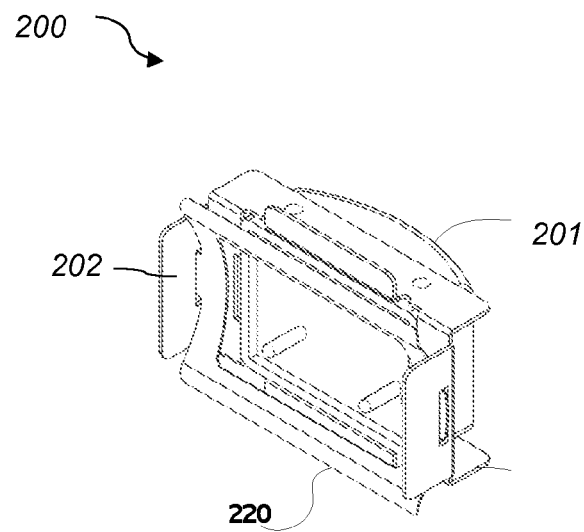
FIG. 3A shows a back perspective view of the magnetic read head mounting mechanism of FIG. 2.
Figure 3B:
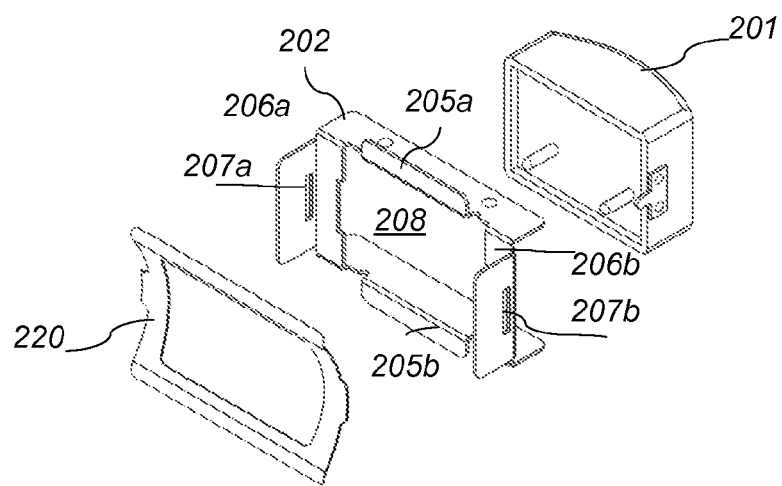
FIG. 3B shows an exploded back perspective view of the magnetic read head mounting mechanism of FIG. 2.
Figure 4:
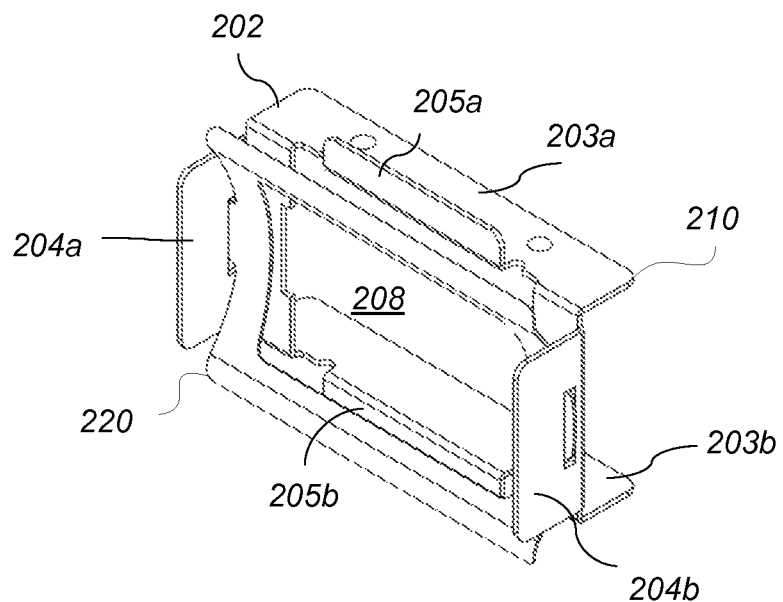
FIG. 4 shows a back perspective view of the mounting assembly of FIG. 2.
Figure 5:
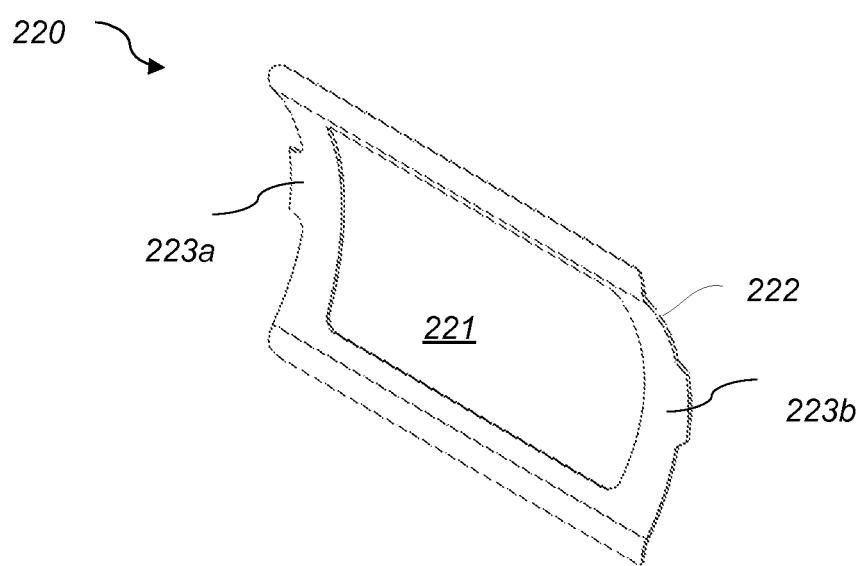
FIG. 5 shows a back perspective view of the curved metal plate spring of FIG. 4.

The present invention describes a method and the mechanism for mounting a magnetic reader head without using the extended wings 103, 104. Instead of the wings 103, 104, an elastic spring body is placed at the back of the magnetic reader head in order to provide the required pressure for a good contact between the magnetic reader head and the magnetic stripe in the card to be read. Referring to FIG. 2, the magnetic reader head module 200 of this invention includes a frame 202, a metal plate spring 220 and the magnetic reader head 201. Magnetic reader head 201 is placed within the frame 202 and metal plate spring 220 is placed behind the frame 202, as shown in FIG. 3A and FIG. 3B. Metal plate spring 220 includes an elastic body 222 in the form of a thin, curved metal plate spring, as shown in FIG. 5. The thin metal plate spring 220 is bent when a pressure is applied and a force that opposes the pressure applied is generated. Elastic body 222 of the metal plate spring 220 includes a central opening 221 and left and right side tabs 223a and 223b, respectively. Frame 202 includes a rectangular body 210 having a central opening 208, left and right backward extending plates 204a, 204b, top and bottom frontward extending plates 203a, 203b, and top and bottom upward and downward extending plates 205a, 205b, respectively. Magnetic reader head compartment 201 is inserted into opening 208 and metal plate spring 220 is place on the back side of the frame 202 within the space defined by the backward extending plates 204a, 204b. Metal plate spring 220 is secured onto the backside of the frame 202 by engaging the elastic body's 222 left and right side tabs 223b, 223a within slots 207b, 207a formed on the left and right side plates 204b, 204a of the frame 202, respectively, as shown in FIGS. 3A, 3B and 4. This loose coupling of the metal spring 220 with the frame 202 provides freedom of movement of the spring 220. In one example, the magnetic read head compartment 201 is a metal case that is welded firmly to the frame 202.

Figure 6:
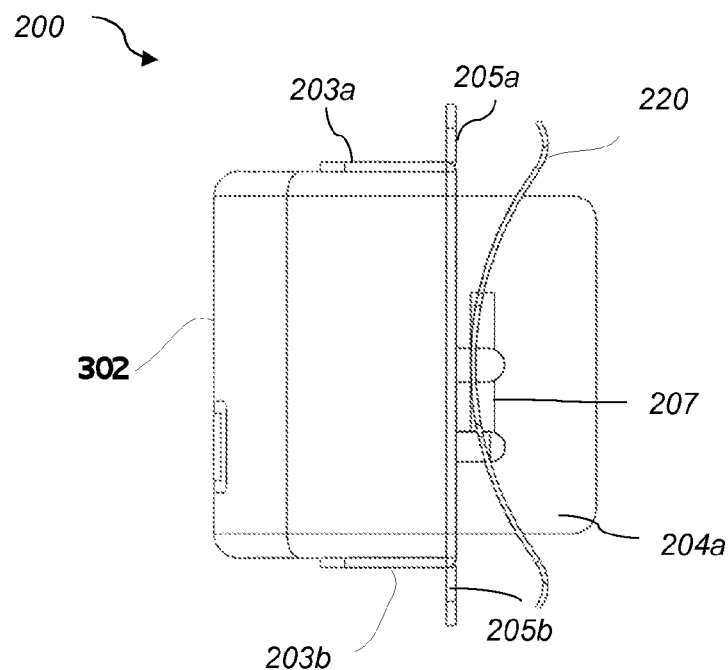
FIG. 6 shows a side view of mounting assembly of FIG. 2.
Figure 7:
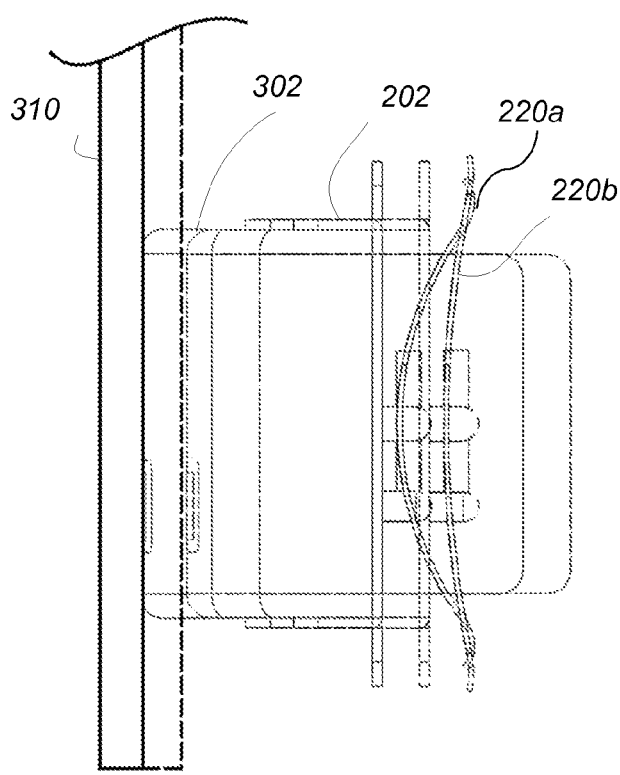
FIG. 7 shows a side view of mounting assembly of FIG. 2 in the stressed and unstressed states.

Referring to FIG. 6, frame 201 holds the spring 220 and the magnetic read head compartment 302. FIG. 7 shows the displacement of the whole assembly when a card 310 is slid against the read head 302. The pressure from the card 310 pushes the whole module 200 back and the spring 220 flattens and extends sideways, as indicated by the dashed spring side profile 220b, shown in FIG. 7. Because of the elasticity of the spring 220, module 200 is able to retract away from the card 310 and to apply a force that pushes the read head 302 against the card 310. This results in a good contact between the card 310 and the read head 302.

Figure 8:
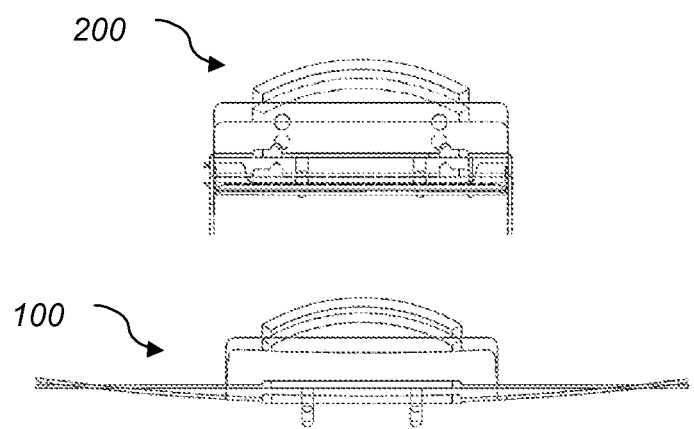
FIG. 8 shows a comparison of the top views of the prior art magnetic read head mounting mechanism of FIG. 1 (bottom) with the magnetic read head mounting mechanism of the present invention of FIG. 2 (top)

By placing the elastic body 220 at the back of the frame 201 instead of sideways, a lot of room can be saved. This allows a more flexible design of the magnetic card reader. FIG. 8 depicts a comparison of the top views of the prior art magnetic read head mounting mechanism 100 (bottom) with the magnetic read head mounting mechanism of the present invention 200 (top). As shown the magnetic read head mounting mechanism of the present invention 200 (top) is smaller than the magnetic read head mounting mechanism of the prior art 100 (bottom).

Figure 9A:
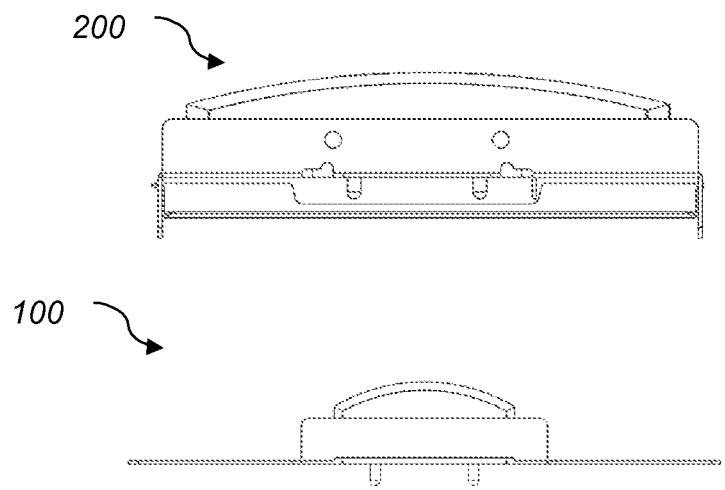
FIG. 9A shows a comparison of the top views of the prior art magnetic read head mounting mechanism of FIG. 1 (bottom) with another embodiment of a magnetic read head mounting mechanism of the present invention (top)
Figure 9B:
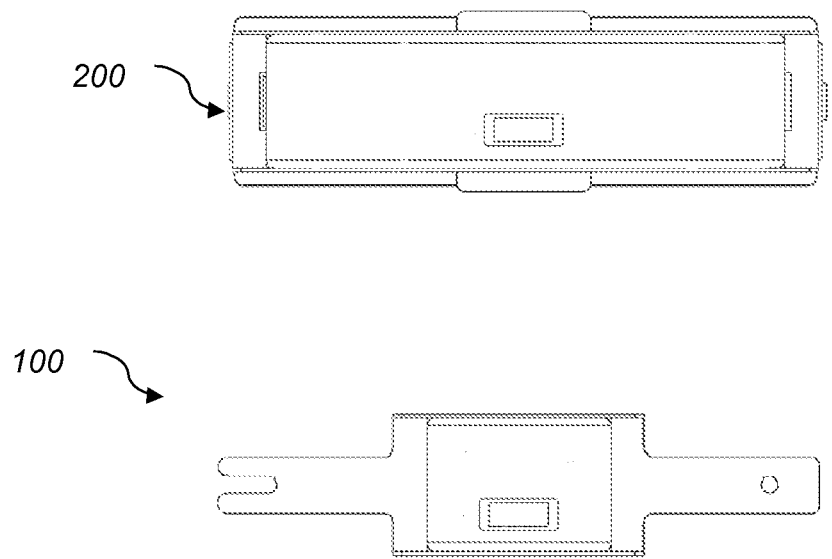
FIG. 9B shows a comparison of the front views of the prior art magnetic read head mounting mechanism of FIG. 1 (bottom) with the embodiment of a magnetic read head mounting mechanism of the present invention of FIG. 9A (top).

FIG. 9A shows a comparison of the top views of the prior art magnetic read head mounting mechanism 100 (bottom)

with another embodiment of a magnetic read head mounting mechanism of the present invention 200 (top). In this embodiment, the size of the entire assembly is increased to take advantage of the additional space created by eliminating the side wings 103, 104. In this embodiment, a larger magnetic read head compartment 201 is used and this allows additional electronics or mechanical components to be housed inside the magnetic read head compartment 201.

Several embodiments of the present invention have been described. Nevertheless, it will be understood that various modifications may be made without departing from the spirit and scope of the invention. Accordingly, other embodiments are within the scope of the following claims.

What is claimed is:

1. A magnetic reader head assembly comprising:
   a magnetic reader head compartment comprising electronic and mechanical components of the magnetic reader head;
   a single-piece frame comprising a front side and a back side and a having a footprint matching the footprint of the magnetic reader head compartment and wherein the front side attaches to a back wall of the magnetic reader head compartment while allowing the magnetic reader head compartment to move out or retract from the frame; and
   an elastic component to be placed at the back side of the frame and to push the frame out in order to press the magnetic reader head compartment against a magnetic card stripe,
      wherein said elastic component comprises a metal plate spring,
      wherein the metal plate spring comprises a curved elastic thin complete rectangular body having a central through-opening and left and right side tabs, the left and right side tabs loosely coupling the elastic component within the frame, and
      wherein the metal plate spring includes a first end and a second end, the first end and the second end able to extend beyond a top end and a bottom end, respectively, of the single-piece frame when the metal plate spring flattens in response to pressure applied to the magnetic reader head compartment.

2. The assembly of claim 1, wherein the frame comprises a rectangular body having a central through-opening, left and right backward extending plates, top and bottom frontward extending plates, a top upward extending plate and a bottom downward extending plate.

3. The assembly of claim 2, wherein the magnetic reader head compartment is inserted in the front side of the frame between the top and bottom frontward extending plates of the frame and the metal plate spring is inserted in the backside of the frame between the left and right backward extending plates of the frame.

4. The assembly of claim 2, wherein the metal plate spring is secured onto the backside of the frame by engaging the left and right side tabs within left and right slots formed on the left and right backward extending plates of the frame, respectively.

5. The assembly of claim 4, wherein said engaging of the left and right side tabs within left and right slots formed on the left and right backward extending plates of the frame provides a loose coupling of the metal plate spring with the frame, therefore enabling freedom of movement of the metal plate spring.

6. The assembly of claim 2, wherein the magnetic reader head compartment is welded in the front side of the frame.

7. The assembly of claim 1, wherein the metal plate spring pushes the frame out due to bending of the entirety of said curved thin complete rectangular body when a pressure due to a magnetic card corresponding to said magnetic card stripe is applied to said metal plate spring.

8. A method for attaching a magnetic card reader head onto a card reader frame comprising:
   providing a magnetic reader head compartment comprising electronic and mechanical components of the magnetic reader head;
   providing a single-piece frame comprising a front side and a back side and a having a footprint matching the footprint of the magnetic reader head compartment and wherein the front side attaches to a back wall of the magnetic reader head compartment while allowing the magnetic reader head compartment to move out or retract from the frame; and
   providing an elastic component to be placed at the back side of the frame and to push the frame out in order to press the magnetic reader head compartment against a magnetic card stripe,
      wherein said elastic component comprises a metal plate spring,
      wherein the metal plate spring comprises a curved elastic thin complete rectangular body having a central through-opening and left and right side tabs, the left and right side tabs loosely coupling the elastic component within the frame, and
      wherein the metal plate spring includes a first end and a second end, the first end and the second end able to extend beyond a top end and a bottom end, respectively, of the single-piece frame when the metal plate spring flattens in response to pressure applied to the magnetic reader head compartment.

* * * * *